United States Patent [19]

Junkermann et al.

[11] 4,340,490

[45] Jul. 20, 1982

[54] PROCESS FOR THE DETOXIFICATION OF WASTE WATER CONTAINING PHENOL, PHENOL DERIVATIVE OR PHENOL AND FORMALDEHYDE

[75] Inventors: Helmut Junkermann, Frankfurt; Horst Krüger, Darmstadt, both of Fed. Rep. of Germany

[73] Assignee: Deutsche Gold- und Silber-Scheideanstalt vormals Roessler, Frankfurt, Fed. Rep. of Germany

[21] Appl. No.: 862,760

[22] Filed: Dec. 20, 1977

[30] Foreign Application Priority Data

Jan. 27, 1977 [DE] Fed. Rep. of Germany ....... 2703267
Jan. 27, 1977 [DE] Fed. Rep. of Germany ....... 2703268

[51] Int. Cl.$^3$ ............................................... C02F 1/72
[52] U.S. Cl. .................................... 210/759; 210/908; 210/909

[58] Field of Search ............... 210/721, 724, 759, 763, 210/908, 909

[56] References Cited

U.S. PATENT DOCUMENTS 4,104,162  8/1978  Junkermann et al. ............. 210/63 R

FOREIGN PATENT DOCUMENTS 646440  8/1962  Canada ............................. 210/63 R
51-15650  5/1976  Japan ................................ 210/63 R

*Primary Examiner*—Thomas G. Wyse
*Attorney, Agent, or Firm*—Cushman, Darby & Cushman

[57] ABSTRACT

Waste water containing phenol, phenol derivatives or phenol plus formaldehyde is purified by treating the waste water with hydrogen peroxide and either iron, copper or the complex salt sodium iron (III) ethylenediamine tetraacetate.

13 Claims, No Drawings

PROCESS FOR THE DETOXIFICATION OF WASTE WATER CONTAINING PHENOL, PHENOL DERIVATIVE OR PHENOL AND FORMALDEHYDE

BACKGROUND OF THE INVENTION

Phenol containing waste water of different concentrations occur in the synthesis of phenol, in coke oven plants and gas making plants, in lignite carbonization and, not of least importance, in the production of phenolformaldehyde resins (phenoplasts).

The removal of toxic phenol without residue and also the removal of the likewise toxic formaldehyde from waste waters of the above-mentioned branches of industry, particularly for a subsequent biological clarification of such waste water is now as ever a very important problem which until now has not been able to be solved satisfactorily within a large range of concentration.

In the mentioned phenoplasts for example in the so-called "reaction waters" which according to the condensation process can react either alkaline or acid, there can be present a content of volatile phenol in the range of 1,700 to 15,000 mg/l and of free formaldehyde between 1,200 and 8,100 mg/l (F. Meinck, H. Stoff, H. Kohlschütter, "Industrie-Abwasser," 4th edition, Gustav Fischer-Verlag, Stuttgart, 1968 page 619).

There are already a large number of processes for the purification of phenol containing waste water which, however, are not universally usable over a large range of concentrations.

At high phenol concentrations, for example, for the purpose of recovery of phenol, a steam distillation can be suitable. Besides, there is a series of extraction processes in which an extraction of the phenol is undertaken with the help of, for example, benzene, toluene or tricresyl phosphate. Attendant on this process is the disadvantage that certain residual parts of the extraction agent enter the waste water; besides, the so-called "Degree of Washing" of the various processes is different so that it is not possible to remove the phenol without residue.

A total removal of phenol can be produced by evaporation of the waste water and burning of the residue. However, this process requires a high expenditure of energy.

At low phenol concentrations it is possible to remove a sufficient amount of phenol also with help of special activated carbon, but the effect depends on the amount of carbon, type and granulation as well as the process (duration of the action, pH and temperature of the waste water).

According to the composition and concentration of the phenol containing waste water the effect of the adsorption is very different and at average and high concentrations too expensive, e.g., from 1,000 ppm and higher.

A further adsorption process consists of the use of specific synthetic resins, e.g., polymethacrylates or polyvinyl benzenes. Thus, the phenol content in a phenol containing waste water can be reduced from 6,700 ppm to about 0.1 ppm (Albright U.S. Pat. No. 3,663,467 and Gustafson U.S. Pat. No. 3,531,463).

However, this type of adsorption process cannot be used in phenol-formaldehyde containing waste waters of the synthetic resin industry because in the thus treated waste water just as before the toxic formaldehyde remains behind.

Sporadically the phenol rich waste water can also be treated biologically according to the "Nocardia Process". Pure cultures such as orgabisms closely related to actinomyces are colonized in trickling filters or activated sludge plants.

In favorable cases a purification effect of 99% can be produced so that even with biological breakdown there always remains a certain residual amount.

The effect depends on the remaining conditions, thus the flora is severely injured by a too great amount of phenol or by other waste water poisons and eventually even destroyed.

The process therefore produces no guarantee for waste water detoxification.

Besides, for adopting such a special biological turf or activated sludge there must be added N and P containing nutrient salts (Gesundh. Ing. Vol. 81 (1960) pages 205 et seq.). This procedure requires the relatively expensive operation of a special biological clarification plant.

A well known process is the oxidation of phenol by means of chlorine dioxide. Chlorine dioxide is obtained either through the action of acids on chlorites, preferably sodium chlorite, or also by reaction of chlorine with sodium chlorite i, e.g., sulfuric acid medium.

However, in the last process there is the danger of chlorination of the phenol to the still more toxic chlorophenols. Besides, the oxidation does not go one hundred percent. This is true even for the development of chlorine dioxide by the action of acids on chlorites. Here also a substantial oxidation can be produced. However, our experiments of this type show, as can be seen from gas chromatographic analysis of this type of treated waste water, that after the oxidation there was always still present a greatly varying residual content of phenol in order of between more than 10 to above 100 ppm. Besides, there occurs in the gas chromatogram foreign peaks which have not been previously identified, from which it can be assumed that it is a matter of intermediate oxidation products (quinones, hydroquinones or eventually even chlorinated products) (see also H. Thielemann, Gesundh, Ing. Vol. 92 (1971) No. 10 page 297).

Also, there should not be disregarded the corrosion problems which occur in the strong acidification of the waste water.

According to data in the literature (Klossowski, Jerzy, Gaz, Woda Tech. Sanit. (1968) Vol. 42 pages 197–200) phenol and its derivatives are decomposed only in an amount of 83% by gaseous chlorine dioxide which is developed from sofium chlorite and sulfuric acid.

The oxidation of phenol by chlorine dioxide in the acid or neutral range should lead to p-benzoquinone as the end product of the phenol oxidation, while in alkaline medium by a high excess of chlorine dioxide (5 mg $ClO_2$ to 1 mg phenol) there is formed a mixture of organic acids, chiefly maleic and oxalic acids (Chemical Abstracts, Vol. 79, 23266m).

In Russian Patent 141,814 there is described the purification of waste waters of phenol-formaldehyde resin production wherein formaldehyde is removed by treatment of the water with quicklime at room temperature or at 98° C. and phenol is removed by oxidation either electrochemically or with $MnO_2$. This process is relatively expensive. By quicklime is meant calcium hydroxide.

In another process the waste water purification from phenol, methanol and formaldehyde is undertaken by means of a so-called "Liquid Phase Oxidation" (I. S. Stepanyan, I. A. Vinokur, G. M. Padaryan, khim, prom (1972) Vol. 6 pages 30–31 or Int. Chem. Eng. Vol. 12 (1972) No. 4 pages 649–651). In this process, the waste water is nozzled into an electrically heated reactor by means of air under 40 bar pressure and at 200° C. However, test data have only given a degree of oxidation around 95% for phenol, 77% for methanol and 93% formaldehyde.

In another series of experiments, the degree of oxidation is only 80% for the named substances. The process is industrially very expensive. There remains a residual amount of the toxic acting materials.

In German OS No. 2,404,264 there is described a process for the preliminary purification of waste water from phenol, formaldehyde and their reaction products after which there is added to the waste water soluble aminoplast resin precondensates or their aqueous solutions. The reaction mixture is held at the boiling temperature in the alkaline range for 2 to 8 hours, subsequently neutralized and the precipitated reaction product separated.

As can be seen from the examples with this process there can merely be produced a preliminary purification of such waste water; a complete removal of phenol and formaldehyde is impossible.

It has also been proposed to treat phenol and phenol-formaldehyde containing waste water with alkali or alkaline earth metal chlorites in the presence of specific amounts of formaldehyde (Junkermann and Hafner application Ser. No. 857,356 filed Dec. 2, 1977 and entitled "Process for the Purification of Phenol and Phenol-Formaldehyde Containing Waste Water" corresponding to German patent application No. P 26 57 192.6). By this process there is obtained a complete elimination of phenol and formaldehyde but the treated waste water is made salty with the alkali or alkaline earth chlorite. The thus treated waste water can then in a given case still be post treated with activated carbon.

Furthermore, it is known to remove phenol from waste waters with hydrogen peroxide, i.e., in the presence of ferric chloride. The pH of the waste water in this case which before the treatment is 2.5 to 3.5 is adjusted after the treatment to 10. After clarification of the suspension with appropriate agents the waste water still contains 0.3 ppm phenol (Japanese patent application 118 8902/72—Publication Number 77449/74).

A further process for the detoxification of phenol-formaldehyde containing waste water likewise uses hydrogen peroxide, i.e., in an amount which is more than 1.5 times the COD (Chemical Oxygen Demand) of the waste water, as well as ferrous sulfate. The pH of the waste water upon the addition of the hydrogen peroxide and the ferrous salt is lowered to 3 to 4 (Japanese patent application 44906/72—Publication Number 6763/74).

Both last named processes refer to lower phenol and formaldehyde contents up to 100 ppm.

To guarantee complete oxidation at higher phenol contents in the waste water, the amount of iron salt must be increased correspondingly which leads to salt loading that cannot be tolerated.

Besides after the last neamed process there still remains a residual formaldehyde content of at least 50 ppm.

Alsos the named processes do not effect detoxification on waste waters which contain phenol derivatives, i.e., substituted phenols, such as brenzcatechol, resorcinol, pyrogallol, cresols, chlorophenol and hydroquinone.

An object of the invention is to completely eliminate phenol, phenol derivatives (substituted phenols) or phenol plus formaldehyde from waste waters, even present at higher concentrations without the occurrence of a salt loading.

As higher concentrations is meant contents of phenol or phenol derivatives of at up to a maximum of 0.5% and formaldehyde contents of up to 5% since at higher concentrations the process is not so economical.

SUMMARY OF THE INVENTION

In one aspect of the invention it has now been found that phenol, phenol derivative (substituted phenol), or phenol plus formaldehyde containing waste water can be completely freed from these compounds by addition of hydrogen peroxide without causing salination (loading with salt) if the waste water is treated with hydrogen peroxide in the presence of metallic iron or copper.

The named metals can be introduced into the waste water container as sheets, wires or granulates; in the case of iron, which is especially preferred, the metal can even be present as the material of the reactor, e.g., as iron reaction or waste water tanks or even as iron stirrers. Because of the expense copper is not generally used in the form of the reaction or waste water tank or as the stirrer.

It has proven most favorable that there be used per cubic meter of waste water an iron surface of 1 to 20 square meters.

As iron there can be used the industrial types such as pig iron, cast iron, steel, see Ullmann, Enzyklopädie der Technischen Chemie (1975), Vol. 10, page 312.

As copper there can be used commercial types, see, for example, Ullmann (1960 Vol. 11, pages 205–206.

In contrast to the prior art process with hydrogen peroxide and iron salts the present process is independent of pH. Thus, it can be carried out with neutral, acid or alkaline waste water without doing anything additional.

The starting up of the detoxification is dependent on the one hand on the height of the concentration of the phenol or phenol derivative or the phenol-formaldehyde concentration and on the other hand the available metal surface per cubic meter of waste water, see Examples 1 and 2 in this connection.

Should the detoxification not commence so quickly, it has proven favorable to accomplish this to add very small amounts of activators to start the reaction. As activators there can be used halides, e.g., chlorides or bromides, sulfates, nitrates, or even organic salts such as the formates of alkali or alkaline earth metals such as sodium, potassium, calcium or barium or even the corresponding salts of zinc, aluminum, nickel or manganese. Sodium chloride is very suitable. Other salts included potassium chloride, calcium chloride, barium chloride, barium bromide, potassium bromide, sodium bromide, sodium sulfate, potassium sulfate, calcium, nitrate, barium nitrate, sodium nitrate, potassium nitrate, sodium formate, calcium formate, potassium formate, zinc chloride, zinc sulfate, aluminum chloride, aluminum sulfate, aluminum nitrate, nickel nitrate, manganese sulfate.

The activators should be used in amounts of 0.1 to 0.2 weight percent, based on the hydrogen peroxide added. It is possible to add them already dissolved in the hydrogen peroxide or to add them in solid form directly into the waste water.

There are also suitable as activators, likewise in the named amounts, highly dispersed silicas insoluble in the water.

Hydrogen peroxide is added in amounts of 7.5 to 8 moles per mole of phenol or substituted phenol. In the presence of formaldehyde it is necessary to add a further 2 moles of hydrogen peroxide per mole of formaldehyde.

The detoxification is carried out preferably at room temperature (about 20° C.) or at the temperature at which the waste water accumulates.

Generally, the waste water which is to be detoxified can be added as such for the process. Only at phenol concentrations above 5,000 ppm it is recommended, if there is desired a purification according to the process of the invention, to dilute the waste water to a phenol value below 5,000 ppm so that the reaction does not proceed too violently.

The quantitative determination of phenol and in certain cases derivatives is carried out gas chromatographically under the following conditions.

Gas chromatograph Perkin-Elmer F 7 with FID. Temperature of the column 180° C.; injection block 230° C.; flow about 24 ml/min; column 1 meter Poropak P, No. 85, amount of sample 1 μl/min; paper advance 0.5 cm/min.

The analysis of the formaldehyde was carried out colorimetrically with the help of the very sensitive condensation reaction between formaldehyde, acetyl acetone and ammonia or ammonium acetate to form the yellow-colored diacetyl dihydrolutidine (T. Nash, Nature (London) Vol. 150 (1952), page 976).

As the simplest and most elegant procedure there has been found that there should be used hydrogen peroxide solutions which contain dissolved therein 0.05 to a maximum of 0.1 weight % of NaCl. It goes without saying that sodium chloride can also be added in solid form to the waste water to be treated.

In general one then proceeds in such manner that to the waste waters which contain the phenol, phenol derivative or phenol and formaldehyde there is added with stirring the corresponding amount of hydrogen peroxide with about 0.1% activator, preferably sodium chloride, whereby inside a few minutes after the end of the addition the oxidation begins at room temperature. It is recognizable by the dark coloration of the waste water, the development of carbon dioxide, the increase in temperature and the reduction of the pH to a value of between 2 and 1.

After the end of the entire reaction, which generally lasts 30 to 60 minutes and is recognizable by the slackening of the development of gas as well as the constant temperature or the cooling which occurs, the acid reacting waste water is then neutralized. Hereby the small amount of iron ions present simultaneously precipitate out.

For neutralization there are suited all known alkali and alkaline earth metal hydroxides, e.g., sodium hydroxide, potassium hydroxide, strontium hydroxide or barium hydroxide but preferably there is employed calcium hydroxide in the form of milk of lime.

After removal of the iron hydroxide precipitate, and in certain cases, alkaline earth metal hydroxide precipitate, the practically almost colorless detoxified waste water is led to the biological clarification plant.

Only after addition of the hydrogen peroxide there is dissolved from the metal surface a violet, also partially brownish colored haze with which the oxidation is apparently catalytically accelerated.

Thus there is not necessary a minimum concentration of iron salts, as is the case of the above-mentioned Japanese patent applications in which the amount of iron salts must be adjusted in each case according to the phenol concentration in order that a complete elimination of the phenol occurs, but the least possible concentration of iron ions is established automatically, independent of the phenol concentration present in each case.

The above-mentioned process of the invention is not as favorable with alkaline reacting waste waters (as with acid or neutral reacting waste waters) since the oxidation reaction is strongly retarded in alkaline medium. For the complete elimination of phenol and formaldehyde for the most part it takes several hours in contrast to the reaction in acid and neutral medium in which the oxidation process is completed within 30 to 60 minutes.

Of course, the process can be accelerated by addition of mineral acids, e.g., sulfuric acid, hydrochloric acid or phosphoric acid to the alkaline waste waters but thereby there results an undesired salt formation in the waste water.

It has now been found as another aspect of the invention that alkaline reacting waste water which contains phenol, phenol derivatives (substituted phenols) and phenol plus formaldehyde also can be relatively quickly detoxified with hydrogen peroxide if there is added to the waste water to be treated 0.5 to 2 g/l of waste water of the complex salt sodium iron (III) ethylenediamine tetraacetate trihydrate (emperical formula $C_{10}H_{12}N_2O_8FeNa\cdot 3H_2O$). Of course, there can also be used the same salt in an equivalent amount without the water of crystallization.

It goes without saying that the just mentioned complex salt can also be added as an aqueous solution to the waste water to be treated.

The amount of hydrogen peroxide per mole of phenol or phenol derivative which is employed to oxidize the phenol or phenol derivative is the same as in the other aspect of the invention, e.g., 8 moles of hydrogen peroxide. With the simultaneous presence of formaldehyde an additional 2 moles of hydrogen peroxide are needed per mole of formaldehyde.

Independent of the phenol and formaldehyde content in the water there is sufficient per liter of waste water 1 to a maximum of 2 grams of the complex salt sodium iron (III) ethylenediamine tetraacetate trihydrate. The pH of the waste water should be at least 8.

Neutral or acid waste waters can also be treated according to the invention if they are previously adjusted to a pH of at least 8, e.g., with alkali liquor (aqueous sodium hydroxide), but not higher than a pH of 12.

Generally, one proceeds in such manner that there is first added to the alkaline reacting waste water to be treated the complex salt used according to the invention and subsequently the necessary amount of hydrogen peroxide solution corresponding to the concentration of phenol, phenol derivative and formaldehyde.

A few minutes, namely, generally after about 5–15 minutes after addition of the hydrogen peroxide the oxidation reaction begins which is noticed by the dark coloration of the waste water, increase in temperature, development of carbon dioxide and reduction of the pH.

At the end of the reaction which lasts about 30 minutes the pH is at most 2.

As pointed out above in connection with the first aspect of the invention to neutralize the acid, dark colored waste water there are suited all known alkali or alkaline earth metal hydroxides but preferably there is used calcium hydroxide in the form of milk of lime.

In the neutralization of the waste water resulting from the process of the invention there takes place lightening and deposition of the alkaline earth metal hydroxide precipitate which contains small amounts of iron hydroxide.

The analysis of phenol and formaldehyde, i.e., both of acid as well as neutralized waste water samples shows that after the use of the process of the invention neither phenol, phenol derivatives nor formaldehyde is present. Their elimination is thus complete.

In the process of the invention there can be eliminated in addition to phenol per se other phenols such as alkylated phenols, e.g., o-cresol, p-cresol, m-cresol, t-butyl phenol, polyhydric phenols, e.g., hydroquinone, resorcinol, pyrocatechol and pyrogallol, halogenated phenols, e.g., chlorophenol.

The following examples further explain the process of the invention. Examples 1–15 are directed to the first form of the invention and examples 16–18 are directed to the second form of the invention.

Thereby there are used both artificially produced waste waters with contents of phenol, phenol derivatives and phenol plus formaldehyde between 100 and 5,000 ppm and even up to 10,000 ppm as well as waste waters of the phenol-resin industry.

The process can comprise, consist essentially of or consist of the steps set forth and the materials employed can comprise, consist essentially of or consist of those set forth.

Unless other wise indicated all parts and percentages are by weight.

DESCRIPTION OF THE PREFERRED EMBODIMENTS

EXAMPLE 1

To 7 waste water samples having phenol contents of 0.5% whose pH values were between 4 and 6, there were added per liter in each case 0.4 ml of a 10% solution of the following salts:

NaCl, calcium formate, $MnCl_2$, $MnSO_4$, $CuSO_4$, $AlCl_3$, $NiSO_4$.

After addition of the salt solutions there were added to the waste water samples in each case under stirring 140–150 ml of a 10% hydrogen peroxide solution. There were hung in the samples iron sheets of the same total surface area (8 square meters per cubic meter of waste water). The iron sheet used was structured steel St 37.

A short ime after addition of the hydrogen peroxide solutions the oxidation reaction began, recognized by the solutions becoming dark, the increase in temperature to 50° to 60° C., the development of carbon dioxide and the reduction of the pH.

Within 40 to a maximum of 50 minutes the oxidation was complete, the temperature fell back slowly, the pH of the waste water samples was between 1.6 and 1.9.

By the addition of milk of lime (30%) the samples were neutralized whereupon there took place the precipitation.

After removal of the time precipitate which contained small amounts of iron hydroxide the supernatant clear waste water was analyzed as set forth above (gas chromatographically).

The analysis showed a complete elimination of phenol.

EXAMPLE 2

An alkaline reacting waste water having a pH of 8.7 and 0.5% of phenol was treated with 4 ml of 10% aqueous sodium chloride solution based on 1 liter of waste water, subsequently there were added with stirring 140 ml of 10% aqueous hydrogen peroxide solution (per liter of waste water). There were hung in the waste water the same iron sheet as in Example 1.

The oxidation reaction started after 30–40 minutes but was finished after a maximum of 60 minutes whereupon the same course in regard to coloration, temperature increase, carbon dioxide development and pH reduction was observed. After the end of the reaction the strongly acid reacting waste water having a pH of 1 was neutralized and worked up as in Example 1.

Here also the phenol was completely removed.

EXAMPLE 3

A waste water sample containing 0.5% phenol and 0.5% formaldehyde having a pH of 5.6 was treated with 253 ml of 10% aqueous hydrogen peroxide solution based on 1 liter of waste water. There were previously dissolved in the hydrogen peroxide solution 0.1% NaCl. In the waste water sample there was located the iron sheet of Example 1.

Immediately after addition of the hydrogen peroxide solution provided with sodium chloride the oxidation reaction began with stirring, it was recognized by the characteristics already mentioned in connection with the previous examples. After a duration of about 30 minutes whereby the temperature increased to 55° C. and the pH sank to 1.5 the reaction was finished. After addition of milk of lime the treated waste water was again neutralized, after removal of the precipitate, the supernatant water was of a yellowish coloration.

The presence of formaldehyde accelerated the complettion of the reaction. The analysis showed that both phenol and formaldehyde were completely eliminated.

EXAMPLE 4

A waste water sample which containing 0.5% phenol and the same amount of formaldehyde and whose pH value was 5.3 was treated with 255 ml of 10% (aqueous) hydrogen peroxide, based on 1 liter of waste water.

In the hydrogen peroxide solution there was dissolved 0.1% NaCl. A copper sheet was placed in the waste water. The copper metal was 99.9% pure; per cubic meter of waste water there were used 15 square meters of copper sheeting.

After addition of hydrogen peroxide, there was a long time until the reaction began, recognizable by the dark coloration of the alkali. The reaction was delayed in comparison to the reactions in the presence of metallic iron, the pH value lowered more slowly, the temperature increase was likewise delayed.

Only after several hours was the reaction ended which otherwise was analogous to the examples described in the earlier examples in regard to coloration, lowering of pH, increased temperature.

The neutralization was carried out in the manner already stated. The yellow-colored waste water which formed above the deposited precipitated no longer showed any phenol and formaldehyde.

EXAMPLE 5

A waste water sample having 0.5% phenol was treated with a 10% hydrogen peroxide solution (amount of additive 140 ml per liter of waste water) in the presence of iron and copper sheets. The sheets corresponded to those in Examples 1 and 4. The initial pH of the waste water was 4.5, the reaction was strongly retarded at room temperature, first upon slight heating to 40° C. could the oxidation be brought to conclusion under the above-described conditions within 70–80 minutes. The analysis showed that neutralized waste water was free from phenol.

EXAMPLE 6

A waste water sample containing 0.5% phenol and having a pH of 6.3 was treated with 5 grams of highly dispersed silica. In the waste water sample there was hung an iron sheet in accordance with Example 1, whereupon under stirring the amount of hydrogen peroxide corresponding to the phenol concentration was added. There was used a 10% aqueous hydrogen peroxide solution in an amount of 140 ml per liter of waste water.

After about 60 minutes the reaction began with increase in temperature and strong reduction in pH and was finished within a further 2 hours. The pH was 1.8. After the treatment with milk of lime the supernatant waste water was colorless and clear, phenol could no longer be detected.

EXAMPLE 7

A great number of waste water samples with different phenol and formaldehyde contents about 100 and 5,000 ppm were oxidatively treated in the presence of metal iron according to Example 1 using 35 weight % peroxide solution and NaCl as in the previous examples.

In part the sodium chloride was dissolved in the peroxide solution, in part the sodium chloride was partially dissolved also in the waste water, wherein per liter of waste water there were used 200 mg of sodium chloride.

In the following table there are set forth the different concentrations of phenol and formaldehyde and the amounts of 35% hydrogen peroxide and sodium chloride are also set forth.

Table to Example 7
Elimination of Phenol and Formaldehyde from Waste Waters.
Necessary Amounts of 35% by Weight Hydrogen Peroxide
Solution per Liter of Waste Water in the Presence of
Metallic Iron

| Concentration of the Waste Water of | | 35 Weight % $H_2O_2$ | |
|---|---|---|---|
| Phenol % | Formaldehyde % | Solution ml | NaCl mg |
| 0.5 | 0 | 36.5[1] | — |
| 0.1 | 0 | 7.5[1] | — |
| 0.01 | 0 | 1.5[1] | — |
| 0.5 | 1.0 | 96.5 | 200 |
| 0.5 | 0.75 | 81.5 | 200 |
| 0.5 | 0.5 | 66.5[1] | — |
| 0.5 | 0.25 | 51.5 | 200 |
| 0.2 | 0.4 | 38.6 | 200 |
| 0.2 | 0.3 | 32.6 | 200 |
| 0.2 | 0.1 | 20.5 | 200 |
| 0.1 | 0.1 | 13.5[1] | — |
| 0.05 | 0.1 | 9.7 | 200 |
| 0.05 | 0.075 | 8.2 | 200 |
| 0.05 | 0.025 | 5.2 | 200 |
| 0.01 | 0.01 | 2.7[1] | — |

[1]Hydrogen peroxide solution containing 0.1% NaCl.

In all cases there could be produced within a short time of between 30 to a maximum of 60 minutes a complete detoxification of the waste water samples, indeed with the higher phenol content quicker than at lower.

EXAMPLE 8

There were treated with stirring in a ferrous reaction container having a capacity of 20 liters made of V 2 A steel waste water samples having phenol contents of 100 and 1,000 ppm as well as samples having phenol and formaldehyde contents of 100 to 1,000 ppm with 35% aqueous hydrogen peroxide solution. Before addition of the hydrogen peroxide solution per liter of waste water there were dissolved in wach case 200 mg of sodium chloride. The amounts of 35 weight % peroxide solutions corresponding to the phenol or phenol and formaldehyde concentrations are taken from the Table to Example 7.

In all charges the course of the oxidation reaction was according to the same pattern as in the previous examples.

After less than 60 minutes the oxidation was ended, the pH of the treated waste water samples was 2.5.

After correspondingly working up the waste water samples the analyses showed that they were free from both phenol and formaldehyde.

EXAMPLE 9

The analysis of a plant waste water from the production of phenol resin (acid condensation with formaldehyde novolak type) showed a phenol content of 4.5% and a formaldehyde content of altogether 5.8%.

The formaldehyde in the predominant part was in bound form, only a portion of 0.06% thereof was free formaldehyde. The pH value of the plant waste water was 3.

Besides phenol and formaldehyde the waste water still contained other organic constituents, inter alia residual organic solvent.

In order to make possible a corresponding detoxification of this waste water from phenol and formaldehyde it was necessary to dilute the waste water at least ten-fold in working with peroxide because otherwise the oxidation reaction would proceed too strongly and uncontrollably.

In a correspondingly large reaction container whose entire inside was provided with sheet iron. 46 liters of the original waste water were diluted with 410 liters of water. There were dissolved 100 grams of sodium chloride in this diluted waste water and subsequently there were added with stirring an amount of 35 weight % aqueous hydrogen peroxide solution totaling 34.5 liters. This amount of hydrogen peroxide is somewhat above the amount required for oxidizing the phenol and formaldehyde because it was found from corresponding laboratory experiments that there also had to be oxidized other organic constituents.

In order that the reaction did not occur too violently the hydrogen peroxide solution was added portionwise, that is, in each case in amounts of 5 to 10 liters.

According to this process the waste water can be completely detoxified within 1 to 2 hours. The temperature increased to 75° C. during the treatment, the pH, which was 6.8 after the dilution of the original waste water, fell to 1.9. After addition of the first portion of hydrogen peroxide because of the strong development of $CO_2$ there first commenced observable foaming which slacked toward the end of the reaction.

After the oxidation reaction the product was neutralized by addition of 30% milk of lime whereby both lime and ferric hydroxide precipitated.

The supernatant foam free waste water which was clear and lighter could then be discharged.

The analysis showed that the waste water was completely free from phenol and formaldehyde.

EXAMPLE 10

A waste water sample containing 1,000 ppm of phenol, a second waste water sample containing 1,000 ppm of phenol and 1,000 ppm of formaldehyde were treated with the necessary amount of 10% aqueous hydrogen peroxide for the oxidation of phenol or phenol plus formaldehyde in the presence of metallic sheet iron, in accordance with Example 1. There was dissolved in the hydrogen peroxide solution 0.1% sodium chloride.

The oxidation proceeded in the manner already described in the previous examples. After the end of the reaction the samples were, as in the other examples, neutralized and the clear, light colored waste water decanted off. Corresponding samples were again analyzed, the analytic results showed that neither phenol nor formaldehyde was still present.

Besides the analyses there were carried out both on the starting samples and also on the samples treated with hydrogen peroxide the chemical and biochemical oxygen demand, besides toxicity measurements as well as a fish test and the determination of carbon.

There were determined on the starting samples which still contained phenol and formaldehyde COD, on the treated waste water samples the COD, the $BOD_5$, the toxicity, the fish toxicity and the TOC value.

The toxicity was measured in the sapromat, the fish toxicity with guppies. The COD value is ascertained according to Standard Methods or according to the methods provided in the rules for discharge of waste water.

The determination of the carbon took place with a Beckmann "Total Organic Carbon Analyzer".

The following table shows the results.

|  | Waste Water with 1000 ppm Phenol | | Waste Water with Phenol and Formaldehyde per 1000 ppm | |
|---|---|---|---|---|
|  | Sample 1 treated | Sample 2 untreated | Sample 3 treated | Sample 2 untreated |
| COD (mg $O_2$/l) | 140 | 2400 | 300 | 3400 |
| $BOD_5$ (mg/l) of 1:1 diluted sample | 33 | — | 34 | — |
| Toxicity checking in % (at 500 ml sample in 1000 ml mixture) | 4 | — | 15 | — |
| TC (mg/l) | 84 | — | 160 | — |
| TOC (mg/l) | 50 | — | 158 | — |
| TAC (mg/l) | 34 | — | 2 | — |
| Fish test: Fish survived 48 hours | 333 ml sample in 1000 ml mixture | — | 333 ml sample in 1000 ml mixture | — |

In the table TC is "total carbon", TOC is "total organic carbon", and TAC is "total inorganic carbon".

As can be seen the COD can be lowered considerably. Also, the $BOD_5$ value is within the acceptable range. The results of the fish test are interesting according to which the added fish survived 48 hours at a mixing ratio of the treated waste water sample of 333 ml in 1000 ml.

EXAMPLE 11

Variation of the Iron Surface (The type of iron used corresponded to that in Example 1)

Waste water samples containing 5,000 ppm, 1,000 ppm and 100 ppm of phenol were treated in the presence of metallic iron with the amount of 10% aqueous hydrogen peroxide solution required for the oxidation of the phenol.

There was dissolved 0.1% of sodium chloride in the hydrogen peroxide solution. The iron surface wetted by the waste water was varied. These iron surfaces were present as sheets as in Example 1.

The following table gives information as to the results:

Elimination of phenol from waste waters with the help of hydrogen peroxide and metallic iron.

Use of a 10% aqueous hydrogen peroxide solution containing 0.1% NaCl.

Influence of the metallic surface area on the reaction rate.

| Phenol Content of the Waste Water | Iron Surface Area in $m^2$ per 1 $m^3$ Waste Water | Reaction Began After Min | Reaction Duration Min |
|---|---|---|---|
| 0.5 | 16 | 5–6 | 17 |
|  | 12 | 5–6 | 21 |
|  | 7.5 | 8–10 | 35 |
|  | 3.5 | 20–22 | 75 |
| 0.1 | 15 | 10–12 | 43 |
|  | 11 | 10–12 | 47 |
|  | 7 | 13–14 | 70 |
|  | 3.5 | 15 | 110 |
| 0.01 | 15 | 25–30 | 65 |
|  | 11 | 40–45 | 100 |
|  | 7 | 55–60 | 120 |
|  | 3.5 | 120 | 220 |

From the table it can be seen that lowering the iron surface area lengthened the reaction time. It goes without saying that the reaction rate also depends on the phenol concentration.

EXAMPLE 12

Waste waters some with 5,000 ppm phenol+5,000 ppm formaldehyde, with 1,000 ppm phenol+1,000 ppm formaldehyde as well as with 100 ppm phenol+100 ppm formaldehyde were, as in Example 11, treated in the presence of metallic iron with the required amount of 10% aqueous hydrogen peroxide for oxidation of the phenol and formaldehyde.

There was dissolved in the hydrogen peroxide solution 0.1% of sodium chloride.

As in Example 11 there was also varied the iron surface area based on the amount of waste water to be treated.

The following table gives information as to the results. It also follows therefrom that with lowering of the iron surface area the time of reaction is increased:

Elimination of phenol and formaldehyde from waste waters with the help of hydrogen peroxide and metallic iron.

Use of 10% aqueous hydrogen peroxide solution containing 0.1% NaCl.

Influence of metal surface area on the reaction rate.

| Phenol Content % | Formaldehyde Content % | Iron Surface Area in $m^2$ per 1 $m^3$ Waste Water | Reaction Began After Min. | Reaction Duration Min |
|---|---|---|---|---|
| 0.5 | 0.5 | 18 | 4-5 | 17 |
| | | 13 | 8-9 | 27 |
| | | 8.5 | 8-9 | 33 |
| | | 4.4 | 10-11 | 52 |
| 0.1 | 0.1 | 16 | 8-9 | 41 |
| | | 11.5 | 8-9 | 52 |
| | | 7.5 | 9-10 | 63 |
| | | 3.6 | 13-14 | 105 |
| 0.01 | 0.01 | 15 | 13-15 | 70 |
| | | 11 | 25-30 | 110 |
| | | 7 | 25-30 | 120-125 |
| | | 3.5 | 30-35 | 175-180 |

EXAMPLE 13

There were treated waste water samples containing 1,000 ppm brenzcatechol, resorcinol, pyrogallol, o- and p-cresol with 35% aqueous hydrogen peroxide solution which in each case had 0.1% of sodium chloride dissolved therein. There were used per mole of the named phenol derivatives 8 moles of hydrogen peroxide and the iron sheets corresponding to those of Example 1.

The oxidation reactions proceeded at normal temperature wherein the reaction started after about 5 minutes. The duration of the reaction with brenzcatechol and resorcinol was 45 minutes in each case, with o- and p-cresol it was about 70 minutes, with pyrogallol it was over 90 minutes.

After this time the waste water samples were free from the named phenol derivatives.

EXAMPLE 14

A further waste water sample containing 1,000 ppm of o-chlorophenol was likewise treated with 35% aqueous hydrogen peroxide solution in which 0.1% of sodium chloride was dissolved in the presence of metallic iron in accordance with Example 1.

Here also the course of the reaction was analogous to that of the other phenol derivatives; after about 1 hour the oxidation reaction was finished and the treated waste water was free from o-chlorophenol.

EXAMPLE 15

A waste water sample containing 0.5% of hydroquinone was treated with 10% aqueous hydrogen peroxide containing 0.1% sodium chloride dissolved therein in the presence of metallic iron in accordance with Example 1.

Per mole of hydroquinone there were used 8 or 10 moles of hydrogen peroxide.

The reaction proceeded under the already mentioned conditions; after about 45 minutes the oxidation was ended and the treated waste water sample was free from hydroquinone.

EXAMPLE 16

Alkaline reacting waste water having pH values between 8 and phenol contents of 100, 1,000 and 5,000 ppm were treated with sodium iron (III) ethylenediamine tetraacetate trihydrate with stirring. The amounts of complex salt, based on a liter of waste water, were between 1 and 2 grams. After solution of the complex salt the necessary amounts of 10% aqueous hydrogen peroxide solution for the phenol content were added with stirring. At 100 ppm there were used 2.8 ml of 10% hydrogen peroxide solution per liter of waste water, at 1,000 ppm of phenol 27.4 ml of 10% hydrogen peroxide per liter of waste water and at 5,000 ppm of phenol 137 ml of 10% hydrogen peroxide solution per liter of waste water.

The same series of experiments were carried out with 35% aqueous hydrogen peroxide solution wherein correspondingly there were used per liter of waste water 1.5 ml of 35% hydrogen peroxide solution for 100 ppm phenol; 7.2 ml of 35% hydrogen peroxide solution for 1,000 ppm phenol and 36.2 ml of 35% hydrogen peroxide solution for 5,000 ppm of phenol.

The reaction was initiated within a few minutes, recognized by the waste water becoming dark, the increase in temperature and reduction in pH as well as development of $CO_2$.

After 30 minutes the oxidation was ended; the acid reacting waste water samples were neutralized by the addition of milk of lime and the clear waste water above the settled precipitate analyzed. The analysis showed that the samples were free from phenol.

EXAMPLE 17

Waste water samples which had pH values between 8 and 9, which besides phenol still contained formaldehyde, namely, in each case 100 ppm phenol plus 100 ppm formaldehyde, 1,000 ppm phenol plus 1,000 ppm formaldehyde and 5,000 ppm phenol and 5,000 ppm formaldehyde were treated with sodium iron (III) ethylenediamine tetraacetate trihydrate with stirring wherein again there were dissolved 1-2 grams of complex salt in the samples per liter of waste water.

Subsequently the addition of 35 weight % aqueous hydrogen peroxide solution took place wherein the following amounts were used.

For the waste water with 100 ppm phenol plus 100 ppm formaldehyde 2.7 ml of 35% hydrogen peroxide solution per liter of waste water; for waste water samples with 1,000 ppm phenol plus 1,000 ppm formaldehyde 13.4 ml of 35 weight % hydrogen peroxide solution based on 1 liter of waste water; for waste water samples with 5,000 ppm phenol+5,000 ppm formaldehyde 66.4 ml of 35% hydrogen peroxide solution per liter of waste water.

After addition of hydrogen peroxide solution the oxidation reaction proceeded according to the process described in Example 16.

Within 30 minutes the oxidation reaction was ended. The acid reacting waste water samples, pH about 2, were neutralized with milk of lime, after settling of the precipitate the light, clear waste water was again analyzed. The analysis showed that all of the samples were completely free from phenol and in several cases only traces of formaldehyde of 10 ppm were present.

EXAMPLE 18

The analysis of an industrial waste water resulting from the alkaline condensation of phenol and formaldehyde (resole resin) showed a phenol content of 0.15% and a formaldehyde content of 0.04%.

The formaldehyde was present in bound form. The pH of the waste water was 8.9. In this waste water there was also still contained amines and ammonia.

A large amount, namely, 400 liters of this industrial waste water was treated under stirring with 400 grams of an aqueous solution of the complex salt of Example 16 (concentration 1 grams/liter of waste water). After solution of the complex salt there were added to the waste water in two portions 6.3 liters of 35 weight % aqueous hydrogen peroxide solution. The first portion was two thirds of the total amount used, the second portion the remainder of the amount. After addition of the first portion the temperature increased. After about 15–20 minutes the oxidation reaction was clearly visible, recognized by reduction of the pH and the at first weaker development of $CO_2$ which subsequently increased. The temperature increased up to 35° C. After addition of the residual amount of hydrogen peroxide the temperature still increased somewhat, the pH fell to about 3.

After about 1 hour the oxidation reaction was ended, whereupon the waste water was colored brown.

Subsequently, it was neutralized by the addition of milk of lime whereupon there was observed a lightening of the waste water. After settling of the lime precipitate which contained small amounts of ferric hydroxide the clear waste water could be analyzed.

The analysis showed that it was completely free of phenol and there were still present only traces of formaldehyde in the order of magnitude of 10 ppm.

It may be noted that 0.5 to 2 grams of sodium iron (III) ethylenediamine tetraacetate trihydrate ($C_{10}H_{12}N_2O_8FeNa.3H_2O$) is equivalent to about 0.44 to 1.84 grams of the anhydrous complex having the formula $C_{10}H_{12}N_2O_8FeNa$.

What is claimed is:

1. A process for purifying waste water containing (1) phenol, (2) a substitute phenol or (3) phenol+formaldehyde comprising treating the waste water with hydrogen peroxide in the presence of 0.5 to 2 grams per liter of waste water of the complex sodium iron (III) ethylenediamine tetraacetate trihydrate or the equivalent amount of the complex sodium iron (II) ethylenediamine tetraacetate, the treatment being at least initiated under alkaline conditions.

2. A process according to claim 1 wherein the waste water contains phenol, an alkyl phenol, a polyhydric phenol, a halogenated phenol or phenol+formaldehyde.

3. A process according to claim 2 wherein the waste water contains phenol, cresol, chlorophenol, resorcinol, pyrocatechol, pyrogallol, hydroquinone or phenol+formaldehyde.

4. A process according to claim 1 wherein the waste water contains phenol.

5. A process according to claim 1 wherein the waste water contains phenol+formaldehyde.

6. A process according to claim 1 wherein the waste water contains phenol or phenol+formaldehyde.

7. A process according to claim 1 wherein there is present 1 to 2 grams of the complex sodium iron (III) ethylenediamine tetraaacetate trihydrate or the equivalent amount of the complex sodium iron (III) ethylenediamine tetraacetate.

8. A process according to claim 1 wherein the treatment of the waste water with the complex is initiated at a pH of at least 8.

9. A process according to claim 8 wherein the treatment is initiated at a pH of 8–12.

10. A process according to claim 9 wherein there are employed 7.5 to 8 moles of hydrogen peroxide per mole of phenol or substituted phenol with the proviso that when formaldehyde is present in the waste water there are employed an additional 2 moles of hydrogen peroxide per mole of formaldehyde.

11. A process according to claim 10 wherein after purification the acid reacting waste water is neutralized.

12. A process according to claim 10 wherein the waste water contains phenol or phenol+formaldehyde.

13. A process according to claim 1 wherein after purification the acid reacting waste water is neutralized.

* * * * *